US011054131B2

(12) United States Patent
Cayton et al.

(10) Patent No.: US 11,054,131 B2
(45) Date of Patent: *Jul. 6, 2021

(54) CANDLE WITH EMBEDDED ITEM AND METHODS FOR MANUFACTURING AND SELLING SAME

(71) Applicant: DIAMOND CANDLES, LLC, Durham, NC (US)

(72) Inventors: David Anthony Cayton, Bahama, NC (US); Justin Winter, Durham, NC (US)

(73) Assignee: DIAMOND CANDLES, LLC, Durham, NC (US)

( * ) Notice: Subject to any disclaimer, the term of this patent is extended or adjusted under 35 U.S.C. 154(b) by 281 days.

This patent is subject to a terminal disclaimer.

(21) Appl. No.: 16/164,688

(22) Filed: Oct. 18, 2018

(65) Prior Publication Data

US 2019/0120484 A1 Apr. 25, 2019

Related U.S. Application Data

(63) Continuation of application No. 15/080,330, filed on Mar. 24, 2016, now Pat. No. 10,113,741, which is a
(Continued)

(51) Int. Cl.
| | |
|---|---|
| *B29C 39/10* | (2006.01) |
| *F23D 3/18* | (2006.01) |
| *C11C 5/00* | (2006.01) |
| *F23D 3/16* | (2006.01) |
| *B29C 70/70* | (2006.01) |

(Continued)

(52) U.S. Cl.
CPC ............ *F23D 3/18* (2013.01); *B29C 39/10* (2013.01); *B29C 70/70* (2013.01); *C11C 5/008* (2013.01); *C11C 5/02* (2013.01); *F23D 3/16* (2013.01); *B29K 2091/00* (2013.01); *B29L 2031/708* (2013.01)

(58) Field of Classification Search
CPC ... F23D 3/18; F23D 3/16; C11C 5/008; C11C 5/02; B29C 39/10; B29K 2091/00; B29L 2031/708
USPC .................. 431/289, 291, 292, 290
See application file for complete search history.

(56) References Cited

U.S. PATENT DOCUMENTS 4,696,640 A * 9/1987 Pitchford ................ F21S 13/00
431/289
6,491,517 B2 * 12/2002 Freeman ................. C11C 5/008
362/161

(Continued)

*Primary Examiner* — Avinash A Savani
(74) *Attorney, Agent, or Firm* — Polsinelli PC

(57) ABSTRACT

A candle with an embedded item and methods for manufacturing same are disclosed. A method for manufacturing a candle having an embedded item can include providing a first set of items of a first value and a second set of items of a second value different from the first value, combining the two sets to create a third set, and distributing the items of the third set among a set of candles, one item per candle, where the presence, nature, or value of the item within the candle is obscured. The method can further include selling the candles for a first price, wherein the presence of the embedded item, the nature of the embedded item, the value of the embedded item, or the value of the embedded item relative to the first price is not known to the purchaser. The embedded item can comprise an object redeemable for a prize.

20 Claims, 2 Drawing Sheets

Related U.S. Application Data continuation of application No. 14/455,103, filed on Aug. 8, 2014, now Pat. No. 9,611,445, which is a continuation-in-part of application No. 14/184,217, filed on Feb. 16, 2014, now Pat. No. 8,899,973, which is a continuation of application No. 13/554,519, filed on Jul. 20, 2012, now Pat. No. 8,758,008.

(60) Provisional application No. 61/598,662, filed on Feb. 14, 2012.

(51) Int. Cl.
*C11C 5/02* (2006.01)
*B29K 91/00* (2006.01)
*B29L 31/00* (2006.01)

(56) References Cited

U.S. PATENT DOCUMENTS

| | | | | |
|---|---|---|---|---|
| 8,214,969 B2* | 7/2012 | Curtis | ................ | B43L 19/0075 |
| | | | | 15/427 |
| 2002/0168919 A1* | 11/2002 | Perkins | ................ | A63H 3/005 |
| | | | | 446/369 |
| 2005/0043082 A1* | 2/2005 | Peterson | ................ | G07F 17/32 |
| | | | | 463/20 |

* cited by examiner

CANDLE WITH EMBEDDED ITEM AND METHODS FOR MANUFACTURING AND SELLING SAME

PRIORITY CLAIM

This application is a continuation of U.S. patent application Ser. No. 15/080,330, filed Mar. 24, 2016, which is a continuation of U.S. patent application Ser. No. 14/455,103, filed Aug. 8, 2014, which is a continuation-in-part from U.S. patent application Ser. No. 14/184,217, filed Feb. 19, 2014, now U.S. Pat. No. 8,899,973, issued on Dec. 2, 2014, which is a continuation from U.S. patent application Ser. No. 13/554,519, filed on Jul. 20, 2012, now U.S. Pat. No. 8,758,008, issued on Jun. 24, 2014, which claims the benefit of U.S. Provisional Patent Application Ser. No. 61/598,662, filed Feb. 14, 2012; the disclosures of which are incorporated herein by reference in their entireties.

TECHNICAL FIELD

The subject matter described herein relates to candles with items embedded within and methods for manufacturing and selling same.

BACKGROUND

People like to give and receive presents. In some cultures it is customary to wrap a gift present in an attractive package which is pleasing to the eye of the recipient and which also prevents the recipient from immediately knowing the nature or value of the present, which peaks the interest of the recipient, increases the recipient's anticipation of the unwrapping of the gift, and increases the recipient's delight and enjoyment of the gift revealed.

Candles are popular gifts due to their pleasant form, color, and/or scent. A burning candle provides a warm, relaxing atmosphere, and candles are associated with love, romance, or special occasions. Candle bodies are typically made of an opaque or translucent material, such as wax, which is consumed while the candle burns.

Candle bodies thus make an ideal container within which to hide an item, such as jewelry, gifts traditionally given on romantic or special occasions, or other items, where the presence, nature, or value of the item is slowly revealed as the candle body is consumed, to the delight of the recipient of the candle. In addition, the excitement of anticipation one feels while waiting to find out the nature or value of a gift received may be heightened when the recipient of a candle containing an embedded item knows beforehand that there is a possibility that the value of the embedded item can be larger, and sometimes much larger, than the purchase price of the candle within which the item is embedded.

Thus, there is a need for candles with items embedded within them where the presence, nature, or value of the embedded item is obscured by the candle body and therefore unknown to the purchaser or user of the candle until the candle body has been consumed sufficiently to reveal the presence, nature, or value of the item.

SUMMARY

According to one aspect, the subject matter described herein includes a method for manufacturing a candle having an item embedded within. In some embodiments, the method can comprise providing a first set of items, each item having a first value, providing a second set of items, each item having a second value different from the first value, combining the first and second sets of items to create a third set of items, and distributing the items of the third set among a set of candles, wherein each candle of the set of candles comprises an enclosure that forms a periphery of the candle, wax that forms a body of the candle, and a wick. One item from the third set can be enclosed within a first container that is embedded within the wax of the candle body, wherein the first container can be attached to the inside of the enclosure that forms a periphery of the candle such that the presence of the first container is visible through the enclosure but the nature of the embedded item from the third set, the value of the embedded item from the third set, or the value of the embedded item from the third set relative to a purchase price of the candle is not discernable while the item from the third set is embedded in the candle.

According to another aspect, the subject matter described herein includes a candle with an embedded item. The candle includes a candle body including wax and a wick, where the candle body includes an embedded item such that the presence, nature, and/or value of the item is obscured by the candle body.

According to another aspect, the subject matter described herein includes a candle with an embedded item. The embedded item can in some embodiments comprise an object that is redeemable for a prize. The embedded item can in some embodiments comprise an object of value such as a ring for example and an object that is redeemable for a prize of greater value. The object that is redeemable for a prize can comprise a token that may be exchanged for the prize. The object that is redeemable for a prize can display a prize identifier for identifying the prize, the type of prize, or the value of the prize. The prize identifier can comprise one or more characters. In some aspects, the object that is redeemable for a prize can be redeemable by submitting the prize identifier to a first party. The first party, in response to receiving the prize identifier, can provide the identified prize. In some aspects, the object that is redeemable for a prize can be redeemable by entering the prize identifier (for example a random code or numerical indicator) into a web page that transmits the prize identifier to the first party. The object that is redeemable for a prize can be redeemable by transmitting the prize identifier to the first party via a letter, an email, a text message, or a telephone call.

As used herein, the term "wax" refers to substances that can be used to form a candle body and which are consumed, usually as fuel, while the candle burns. Examples include, but are not limited to, animal fats or waxes, such as tallow, insect waxes, such as bee's wax, plant waxes and fats, such as soy-based products, and petroleum-based substances, such as paraffin.

As used herein, the term "wick" refers to any object which holds the flame of a candle. Examples include, but are not limited to, string, cord, wood, or other objects that draw the liquid fuel to the flame, usually via capillary action.

According to yet another aspect, the subject matter described herein includes a method for manufacturing a candle that contains an item whose presence, nature, and/or value is obscured from the buyer. The method includes attaching an item to the inside of a container, and filling the container with wax such that the wax obscures the nature or value of the item.

According to yet another aspect, the subject matter described herein includes another method for manufacturing a candle that contains an item whose presence, nature, or value is obscured from the buyer. The method includes adding a first amount of wax to a container or mold, allowing the first amount wax to harden sufficiently enough to support an item that is placed on the surface of the wax, placing the item on the surface of the wax; and adding into the container a second amount of wax at least sufficient to obscure the presence, nature, or value of the item.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The subject matter described herein includes a candle having an embedded item within and methods for manufacturing and selling same. Example embedded items include, but are not limited to, jewelry, such as rings, earrings, and chains, precious or semiprecious stones, pearls, etc. Alternatively, or in addition, in some embodiments example embedded items include, but are not limited to, tokens or redeemable objects that can be redeemed in exchange for jewelry, such as rings, earrings, and chains, precious or semiprecious stones, pearls, etc. As an example, a method for manufacturing a candle having a ring embedded or token for a ring within is disclosed.

Figure 1:
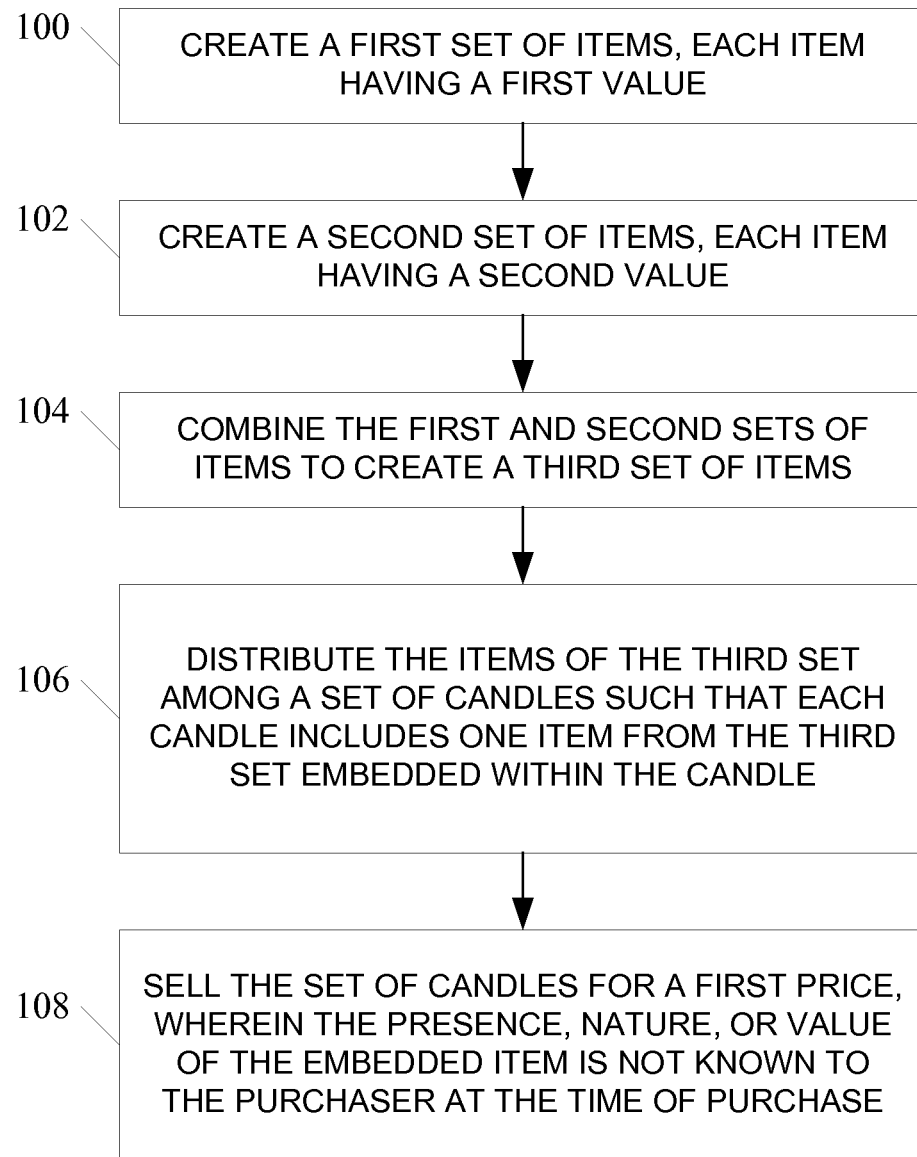
FIG. 1 shows a method for making a candle that contains an item according to one embodiment of the subject matter described herein.

FIG. 1 shows a method for making a candle that contains an item according to one embodiment of the subject matter described herein. At step 100, a first set of items, each having a first value, is created. For example, a set of rings, each ring worth $10, can be collected and optionally prepared for embedding within the finished product candles. At step 102, a second set of items, each having a second value, is created. For example, a set of rings, each ring worth $100, can be collected and optionally prepared for use. Other sets of rings can be collected, each additional set having rings each worth another value, such as $1,000 per ring, $5,000 per ring, and so on. The values used above are for illustration only and are not limiting. All items in a set need not be the same. For example, a set of items can include different types of items, such as rings, earrings, pins, etc., but having the same or very similar relative value. Moreover, items in one set need not be the same as items in another set. For example, the first set of items could be rings and earrings while the second set of items could be bracelets and necklaces.

At step 104, the sets of rings are combined. At step 106, the combined set of items is distributed among a set of candles such that each candle includes one item from the combined set embedded within the candle. Optionally, in some embodiments, in step 108 the candles can be sold for a first price, where the value of the embedded item is not known to the purchaser at the time of purchase. In one embodiment, the value of the item cannot be determined by the purchaser of the candle until the candle has been burned or the wax melted to expose the item (or allow the item to be removed and unwrapped if the item has been encased in a pouch, bag, or protective wrapping.) In one embodiment, the purchaser knows that a candle might contain an embedded item but cannot determine at the time of purchase whether the candle does or does not contain the embedded item.

Referring again to FIG. 1, in some embodiments at step 100, a first set of items, each having a first value, is created. For example, a set of rings, each ring worth $10, can be collected and optionally prepared for embedding within the finished product candles. Then, in some embodiments at step 102, a second set of items, each having a second value, is created. For example, tokens, vouchers or redeemable objects (referred to collectively as redeemable objects) for a set of rings, each ring worth $100, can be collected and optionally prepared for use. Other sets tokens, vouchers or redeemable objects for rings can be collected, each additional set of tokens, vouchers or redeemable objects being redeemable for rings each worth another value, such as $1,000 per ring, $5,000 per ring, and so on. The values used above are for illustration only and are not limiting. All items, tokens, vouchers or redeemable objects in a set need not be the same. For example, a set of items can include different types of items, such as rings, earrings, pins, etc., but having the same or very similar relative value. Moreover, items or redeemable objects in one set need not be the same as items in another set. For example, the first set of items could be rings and earrings while the second set of items could be bracelets and necklaces, or redeemable objects for the same.

In some embodiments, at step 104, the sets of rings and redeemable objects are combined. At step 106, the combined set of items is distributed among a set of candles such that each candle includes one item from the combined set embedded within the candle. Thus, in some aspects a candle can have embedded therein an item from the first set of items, e.g. a ring, having a first value, or an item from the second set of items, e.g. a redeemable object for a ring of a second value. Alternatively, in some embodiments at step 106 the combined set of items is distributed among a set of candles such that each candle includes one item from the first set of items, e.g. a ring of a first value, and one item from the second set of items, e.g. a redeemable object for a ring of a second value.

Thus, in some embodiments, a candle can have a ring with a first value, or a ring with a second value, or a ring with a first value plus a redeemable object for a ring of a second value, or a ring with a second value plus a redeemable object for a ring of a first value. In some embodiments, a candle can have a ring of a first value, or a redeemable object that is redeemable for a ring of a second value. In some embodiments, the ring of the first value is a value less than the purchase price of the candle, and the redeemable object for a ring of a second value has a value greater than, in some instances significantly greater than, the purchase price of the candle. In some embodiments, a candle can have a redeemable object redeemable for a ring of a first value, or a redeemable object that is redeemable for a ring of a second value. In some embodiments, the ring of the first value is a value less than the purchase price of the candle, and the redeemable object for a ring of a second value has a value greater than, in some instances significantly greater than, the purchase price of the candle.

Optionally, in some embodiments, in step 108 the candles can be sold for a first price, where the value of the embedded item(s) is not known to the purchaser at the time of purchase.

In one embodiment, the value of the item(s) cannot be determined by the purchaser of the candle until the candle has been burned or the wax melted to expose the item (or allow the item to be removed and unwrapped if the item has been encased in a pouch, bag, or protective wrapping.) In one embodiment, the purchaser knows that a candle might contain an embedded item, and/or a redeemable object that is redeemable for an item of value, but cannot determine at the time of purchase whether the candle does or does not contain the embedded item(s).

Figures 2A, 2B, 2C, 2D:
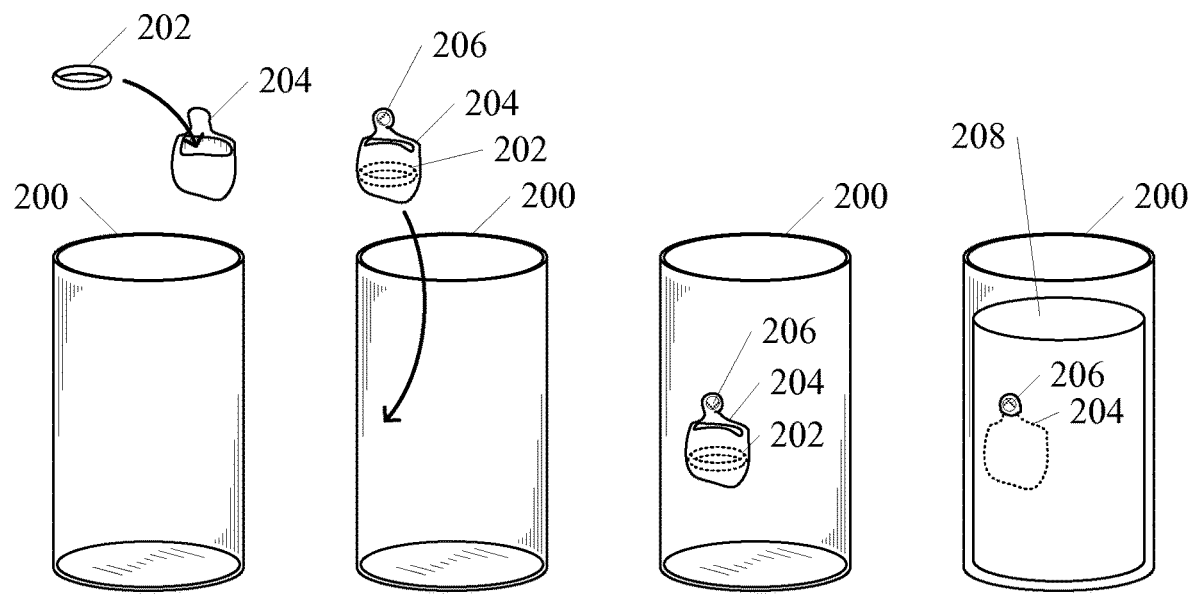
FIGS. 2A through 2D show the steps of a method for manufacturing a candle having an item embedded within according to an embodiment of the subject matter described herein.

FIGS. 2A through 2D show the steps of manufacturing a candle having an item embedded within according to one embodiment of the subject matter described herein. In FIG. 2A, an enclosure or container 200 is provided. In one embodiment, enclosure or container 200 can be intended to contain the finished product, and can be made of glass, plastic, or other material, and can be transparent, translucent, opaque, or some combination. Alternatively, enclosure or container 200 may not be intended to contain the finished product, e.g., the container can be a mold that is used (and possibly reused) during manufacture and is not a part of the finished product.

An item 202, such as a ring, jewelry, prize, redeemable object or other item, is placed into a pouch 204 or other item container. In FIG. 2B, adhesive 206 can in some embodiments be applied to the pouch 204 containing item 202, and pouch 204 can be attached to the inside wall of candle enclosure or container 200, such that the pouch is affixed to the inside of the candle container, as shown in FIG. 20. Wax 208 can then be poured into candle enclosure or container 200, covering the pouch 204 and obscuring the item 202 from view, resulting in the product shown in FIG. 2D. In one embodiment, a wick can be placed or affixed within container 200 prior to adding wax 208. Alternatively, a wick can be inserted into wax 208 after it has been poured into enclosure or container 200.

For example, in one embodiment, rings of different values are placed into small plastic bags, and in some embodiments each small plastic bag can be wrapped in gold foil or the like. Alternatively, in one embodiment, rings and/or redeemable objects of different values are placed into small plastic bags, and in some embodiments each small plastic bag can be wrapped in gold foil or the like. For each ring and/or redeemable object wrapped in plastic and gold foil, a small gold foil indicator is glued to the gold foil that contains the ring and bag. The small gold foil indicator is glued to the inside of the glass container, which allows the customer to see the location of the ring and/or redeemable object within the container. The small gold foil indicator is visible through the glass container. Wax is poured into the glass container and a wick is installed into the wet wax. In one embodiment, the wax is soy wax. The wax cools or is cooled, and labels are applied to the glass container and/or the wax. In one embodiment, the item can be affixed in more than one place to the container prior to filling the container with wax. In one embodiment, the process can include applying labels or decorations to the inside or outside of enclosure or container 200 prior to adding wax 208. For example, the process can include applying a safety label to the bottom of a glass container that will contain the candle wax.

Figures 3A, 3B, 3C:
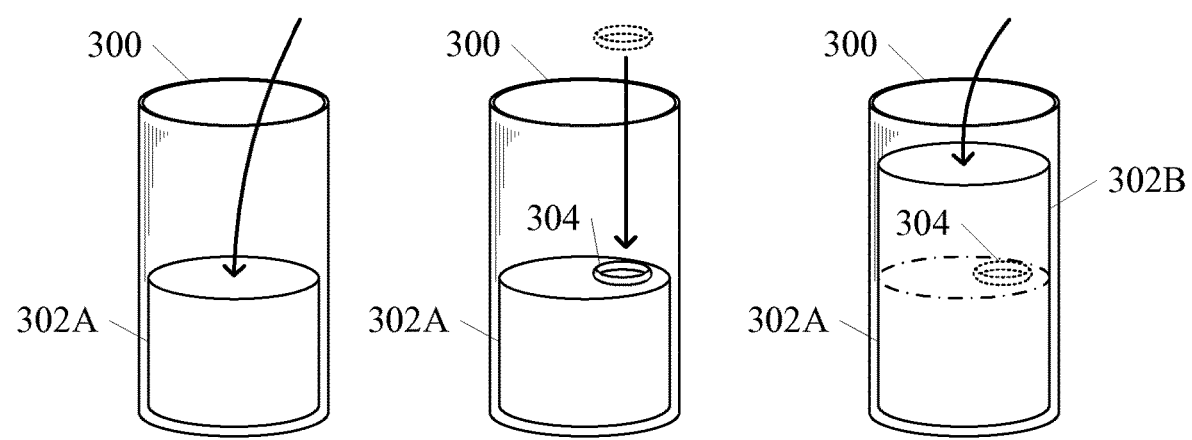
FIGS. 3A through 3C show the steps of an alternative method for manufacturing a candle having an item embedded within according to an embodiment of the subject matter described herein, in which the candle can be partially constructed and the item introduced or placed into the candle before construction of the candle is completed.

FIGS. 3A through 3D show the steps of an alternative method for manufacturing a candle having an item embedded within, in which the candle can be partially constructed and the item introduced or placed into the candle before construction of the candle is completed. In FIG. 3A, for example, a candle mold or container 300 can be partially filled with wax 302A, which is allowed to harden until it is firm enough to support the item 304 (e.g. ring and/or redeemable object) in the desired location within the candle body. In FIG. 3B, item 304 is placed onto or into the firm wax 302A at or near the desired location within the candle body, and in FIG. 3C, additional wax 302B is placed into mold 300. The amount of additional wax 302B is sufficient to at least cover and obscure item 304 and can partially or completely fill container 300. In one embodiment, a wick is then inserted into wax 302A and 302B. In an alternative embodiment, the wick is placed within container 300 prior to adding wax 302A and/or wax 302B.

The subject matter described herein also includes a candle with an item embedded within, such as are shown in FIGS. 2D and 30. In one embodiment, the item can be a ring, other types of jewelry, other types of prizes, a redeemable object that is redeemable for jewelry or other object, or other item. In one embodiment, the candle is designed such that the existence, nature, or value of the embedded item and/or redeemable object cannot be determined without burning the candle or otherwise melting the wax so that the item is exposed to view.

In one embodiment, a purchaser or recipient is not aware at the time of purchase or receipt that the candle contains an embedded item at all. In one embodiment, the purchaser or recipient is aware at the time of purchase or receipt that the candle does contain an embedded item, but the candle is designed so that at the time of purchase or receipt, a purchaser or recipient of the candle does not know or cannot determine the general nature of the item, the exact nature of the item, the absolute value of the item, the price range of the item, the value of the redeemable object or the value of the object for which it can be redeemed, and/or the value of the item relative to the purchase price of the candle.

The candle can comprise wax within a shell or container, or wax not contained in a shell or container. The wax and/or container can be transparent, translucent, or opaque. For example, all or part of the container can be transparent allowing the wax to be seen, but the opacity of the wax prevents the buyer from determining the nature or value of the item embedded within. Alternatively, the wax can be translucent but the container is also translucent with the result that the nature or value of the item embedded within the wax is indiscernible. Alternatively, the nature or value of the item can be obscured by an opaque material (other than the wax of the candle) that surrounds or covers the item and where the item and the opaque covering are both embedded within the candle wax. In one embodiment, the wax and container can be transparent or translucent enough to see the item but the opaque material in which the item is wrapped obscures the nature or value of the item. In one embodiment, the item can be covered or wrapped with a material that prevents damage to the item from the heat of the candle flame as the candle wax is burned away to expose the item.

The subject matter described herein also includes a method for making a candle that contains an item such that the nature and/or value of the item is obscured from the buyer and/or recipient. In one embodiment, the value of the embedded item, or object redeemable for an item, can be less than the sale price of the candle, equal to the sale price of the candle, greater than the sale price of the candle, or much greater than the sale price of the candle. For example, a candle can be sold for $25 that contains within it a ring which can have a value of $10, $100, $1,000, or $5,000, or a redeemable object that can be redeemed for a ring which can have a value of $10, $100, $1,000, or $5,000.

What is claimed is:

1. A candle having prizes embedded therein, wherein the candle comprises:
   a body composed at least partially of translucent wax; and
   a pair of prizes wrapped in an opaque material and embedded in the body and wherein at least one of the pair of prizes in the body has a variable monetary value with respect to one or more other candles with embedded prizes therein.

2. The candle recited in claim 1, wherein only one of the pair of prizes in the body has a variable monetary value with respect to the one or more other candles.

3. The candle recited in claim 2, wherein one of the pair of prizes in the body has the same monetary value with respect to the one or more other candles.

4. The candle recited in claim 3, wherein the prize in the body that has the same monetary value with respect to the one or more other candles is a token representative of at least one of (1) a prize and (2) a characteristic of a prize.

5. The candle recited in claim 3, wherein only one of the pair of prizes in the body has the same monetary value with respect to the one or more other candles.

6. The candle recited in claim 1, wherein the prize in the body that has a variable monetary value with respect the to one or more other candles is a piece of jewelry.

7. The candle recited in claim 6, wherein the jewelry is a ring.

8. The candle recited in claim 6, wherein the jewelry is an earring.

9. The candle recited in claim 6, wherein the jewelry is a chain.

10. The candle recited in claim 1, wherein the candle has a same retail price as the one or more other candles.

11. The candle recited in claim 10, wherein the candle and the one or more other candles are randomly positioned with respect to one another regarding the monetary value of the prizes in each candle that have a variable monetary value thereby establishing a game of chance with respect to prize value upon selection of a candle.

12. The candle recited in claim 1, wherein at least one of the pair of prizes is a token that represents a respective prize or characteristic of the respective prize.

13. The candle recited in claim 1, wherein a first prize of the prizes having a variable monetary value has a first monetary value and a second prize of the prizes having a variable monetary value has a second monetary value and wherein the second monetary value is greater than the first monetary value.

14. The candle recited in claim 1, wherein a first prize of the prizes having a variable monetary value has a first monetary value and a second prize of the prizes having a variable monetary value has a second monetary value and wherein the second monetary value is at least twice the first monetary value.

15. The candle recited in claim 1, wherein a first prize of the prizes having a variable monetary value has a first monetary value and a second prize of the prizes having a variable monetary value has a second monetary value and wherein the second monetary value is at least ten times the first monetary value.

16. The candle recited in claim 1, wherein a first prize of the prizes having a variable monetary value has a first monetary value and a second prize of the prizes having a variable monetary value has a second monetary value and wherein the second monetary value is at least one hundred times the first monetary value.

17. The candle recited in claim 1, wherein the body is housed within a container and at least one of the prizes is invisible from an exterior of the container.

18. The candle recited in claim 1, wherein the body is housed within a container through which at least one of the prizes is visible.

19. The candle recited in claim 18, wherein the at least one visible prize is attached to the container.

20. The candle recited in claim 1, wherein the body is housed within a container through which a protective wrapper to which at least one of the prizes is embedded is visible.

* * * * *